La Fayette Louis,
Tremolo,
N 3,185.
Reissued Nov. 10, 1868.
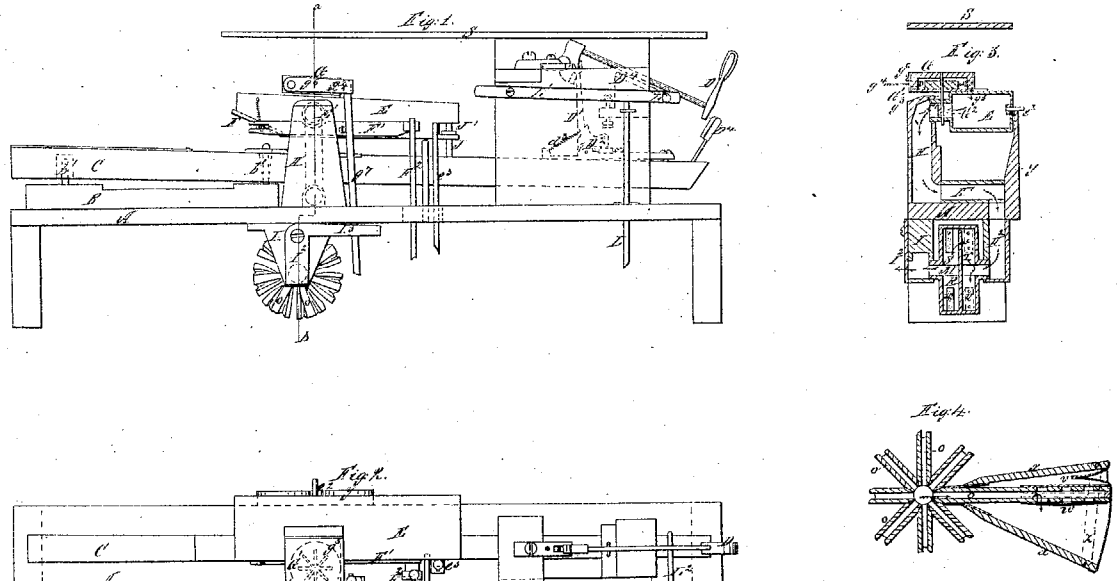
Witnesses:
E. B. Horbush
C. A. Brown
Inventor:
La Fayette Louis
N. PETERS, PHOTO-LITHOGRAPHER, WASHINGTON, D. C.

UNITED STATES PATENT OFFICE.

LAFAYETTE LOUIS, OF BOSTON, MASSACHUSETTS.

IMPROVEMENT IN WIND MUSICAL INSTRUMENTS.

*Specification forming part of Letters Patent No.* 35,528, *dated June* 10, 1862; *reissue No.* 3,185, *dated November* 10, 1868.

DIVISION B.

*To all whom it may concern:*

Be it known that I, LAFAYETTE LOUIS, of Boston, in the county of Suffolk and State of Massachusetts, (formerly of Buffalo, New York,) have invented new and useful Improvements in Melodeons and other Musical Instruments; and I do hereby declare that the following is a full and exact description, reference being had to the accompanying drawings.

My invention relates principally to the construction and arrangement of the tremolo and the bellows or wind-actuating mechanism of melodeons, and the invention will be herein particularly described as applied to a melodeon.

The invention consists in combining with a rotary tremolo-valve a rotary wheel for actuating the tremolo-valve, the tremolo-wheel and rotary wheel being arranged upon the same shaft or connected by a train of gearing, so that the valve-wheel shall be directly actuated by the wind-wheel.

Also, in the employment of a rotary bellows, which bellows may combine both the suction and pressure principles, both principles acting in separate apartments in the bellows with the melodeon, by which the air, after acting upon the melodeon-reeds, may be confined in the bellows or forced out at pleasure, thereby regulating the degree of air-pressure upon the melodeon or other instrument, using the air which has acted upon the melodeon-reeds for neutralizing and controlling both the suction and pressure power of the bellows, and thereby increasing or diminishing the power of the tone.

Figure I of the drawings represents in vertical section the melodeon mechanism. Fig. II is a plan of the same. Fig. III is a vertical cross-section taken on line *a b* of Fig. I. Fig. IV is a section to represent more fully the construction of the compound rotary bellows.

E represents a melodeon tube-board, which, when constructed and used according to my improvements, should contain air-chamber, tubes, swell, and reeds to the extent of three or more octaves. This tube-board is hung upon a shaft or journals upon which it oscillates as a center. One of the journals, marked E′, is hollow, and forms a wind-tube, or a portion of the wind-passage from the tube-board to the bellows. One end of this hollow journal opens into the air-chamber of the melodeon tube-board, and the other into the air-tube H, all of which is shown in Fig. III. The other journal is made of smaller size, and is supported upon the standard *y*, as shown at $e^2$. The tube-board will turn upon these journals as a center, whenever it is desired to disconnect the tube-board. This is accomplished by means of a rod or lever, $e^3$, hinged to the tube-board, and connecting with a treadle or otherwise the melodeon tube-board turning upon its journals, as before described.

F, swell; $F^1$ and $F^2$ are levers connecting the swell with treadle for opening the swell. G, tremolo, in combination with the melodeon tube-board. (A tremolo was patented by me November 18, 1856, to which reference may be had.)

$G^1$, tremolo-wheel; $G^2$, rotary tremolo-valve, the wheel and valve both being upon the shaft $g^3$. This arrangement of the wind-wheel and tremolo-valve insures a certainty and precision in the action of the tremolo not otherwise attainable. At $g^4$ is shown an orifice which opens from the external air into the tremolo, and at $g^5$ is shown an orifice which opens out of the tremolo into the air-chamber of the tube-board, so that the inward passing of the air will revolve the wheel.

At $g^6$ is represented a valve which covers the orifice $g^4$. This valve is operated by means of the lever $g^7$, which connects with the treadle. By this arrangement the air may be let in or shut off from the tremolo at pleasure.

H represents a hollow standard or tube, which connects with the hollow journal E′ of the tube-board, and forms a journal-bearing therefor. There is also a cross or continuation tube, $H^1$, which leads from this to the hollow hanger, $H^2$. The bellows-shaft M is also made hollow at its ends, but solid at its center, so that the air cannot pass directly through the bellows-shaft, but is drawn in at one end of the shaft by suction and fills the bellows, and is discharged at the other end by pressure, so that there is a complete air-passage from the tube-board through the bellows, as indicated by the arrows in Fig. III.

I represents a hanger, dropping down for the support of one end of the bellows-shaft. The other end of the bellows-shaft is supported in the hollow hanger $H^2$.

The hanger I has an aperture, in conjunction with the open end of the bellows-shaft, for the escape of the air from the pressure side of the bellows.

$I^2$ represents a valve or stop which covers this aperture, and $I^3$ is a lever for operating the valve. This valve or stop is so placed and arranged that the performer may partly or fully open and close the aperture at pleasure. When it is closed, so that the air cannot freely escape, the force of the weights upon the bellows is neutralized, and when opened for a free escape of the air, the force of the bellows is restored, and hence full power of air upon the melodeon-reeds. This improvement gives me entire control of the air-power of the bellows, and enables me so to combine and use the suction and pressure principles as to produce a new musical effect, viz., a perfect "crescendo" and "diminuendo."

L is a lever, which connects with a hinged lever, $L^1$, which also has an arm, $L^2$, projecting at right angles thereto. The bellows has rigid arms O, which are divided into two parts or air-chambers, S and T by the partition R. Ingress and egress air-valves are made in these rigid arms, as shown at V and W, the valves V connecting with the suction part of the bellows, and the valves W with the pressure part.

The flaps X on either side of the rigid arms are connected by the rigid bar Z, which also forms a weight which acts at the same time upon both the suction and pressure parts of the bellows.

The bellows is revolved by pedal and crank, or by spring and clock work, or by other appropriate and well-known means.

The flap which is falling toward the stationary arm is pressing or forcing the air out, and the flap which is falling from the stationary arm is sucking the air in, and these two principles must act simultaneously and equally, for they are connected by the weighted bar Z; hence confining the air in the pressure part of the bellows, by means of the valve $I^2$, will prevent or retard the pressure-flap from falling toward the stationary arm, and at the same time prevent or retard the suction-flap from falling from the stationary arm, and thereby neutralize the power of the weights and regulate the quantity of tone at will.

I claim—

1. In combination with a rotary tremolo-valve, a tremolo actuating-wheel placed upon the tremolo-valve shaft, or directly connected therewith, so as to actuate the rotary tremolo-valve, substantially as described.

2. In combination with a wind musical instrument, a rotary wind-actuating bellows, substantially as described.

LAFAYETTE LOUIS.

Witnesses:

C. C. DICKERMAN,
FRANCIS GOULD.